United States Patent
Takahashi et al.

(10) Patent No.: US 10,567,662 B2
(45) Date of Patent: Feb. 18, 2020

(54) IMAGING DEVICE AND CONTROL METHOD THEREFOR USING SHIFT DIRECTION CALCULATION

(71) Applicant: FUJIFILM Corporation, Tokyo (JP)

(72) Inventors: Kosuke Takahashi, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 16 days.

(21) Appl. No.: 15/940,050

(22) Filed: Mar. 29, 2018

(65) Prior Publication Data

US 2018/0227497 A1    Aug. 9, 2018

Related U.S. Application Data

(63) Continuation of application No. PCT/JP2016/078712, filed on Sep. 28, 2016.

(30) Foreign Application Priority Data

Sep. 30, 2015  (JP) .................................. 2015-193514

(51) Int. Cl.
*H04N 5/232* (2006.01)
*G03B 13/16* (2006.01)
(Continued)

(52) U.S. Cl.
CPC ........... *H04N 5/23293* (2013.01); *G02B 7/34* (2013.01); *G02B 7/36* (2013.01); *G02B 27/0093* (2013.01);
(Continued)

(58) Field of Classification Search
CPC ......... H04N 5/23293; H04N 5/232941; H04N 5/232939; H04N 5/232945;
(Continued)

(56) References Cited

U.S. PATENT DOCUMENTS 9,485,430 B2 * 11/2016 Inoue .................... G02B 7/346
10,048,750 B2    8/2018 Du et al.
(Continued)

FOREIGN PATENT DOCUMENTS

| CN | 103605208 A | 2/2014 |
|----|-------------|--------|
| CN | 104782110 A | 7/2015 |

(Continued)

OTHER PUBLICATIONS

International Preliminary Report on Patentability and Written Opinion of the International Searching Authority (Forms PCT/IB/326, PCT/IB/373 and PCT/ISA/237) dated Apr. 12, 2018, for International Application No. PCT/JP2016/078712, with an English Translation of the Written Opinion.

(Continued)

*Primary Examiner* — Padma Haliyur
(74) *Attorney, Agent, or Firm* — Birch, Stewart, Kolasch & Birch, LLP

(57) ABSTRACT

The digital camera includes a finder section, an imaging optical system, a focus ring, an eye sensor, an imaging element, a main control section, a digital signal processing section, and a finder display control section. The imaging element outputs first and second imaging signals obtained by receiving the first and second rays formed by performing pupil division on the subject image. The main control section calculates an amount of defocus so as to generate a defocus image, on the basis of first and second imaging signals obtained by receiving first and second rays. The eye sensor detects an eye position P of a photographer who is in contact with the finder section. The finder display control section changes a position, at which the defocus image is displayed, in accordance with the direction of shift of the eye position P.

11 Claims, 14 Drawing Sheets

(51) Int. Cl.
  *G02B 7/34* (2006.01)
  *G03B 17/20* (2006.01)
  *H04N 5/225* (2006.01)
  *G03B 13/06* (2006.01)
  *G02B 27/00* (2006.01)
  *G02B 7/36* (2006.01)
  *G03B 13/32* (2006.01)

(52) U.S. Cl.
  CPC ............. *G03B 13/06* (2013.01); *G03B 13/16* (2013.01); *G03B 17/20* (2013.01); *H04N 5/22525* (2018.08); *H04N 5/23212* (2013.01); *H04N 5/23219* (2013.01); *H04N 5/232122* (2018.08); *H04N 5/232939* (2018.08); *H04N 5/232941* (2018.08); *H04N 5/232945* (2018.08); *G03B 13/32* (2013.01)

(58) Field of Classification Search
  CPC ......... H04N 5/232122; H04N 5/22525; H04N 5/23212; H04N 5/23219; G03B 13/06; G03B 13/16; G03B 17/20; G03B 13/32; G02B 7/36; G02B 7/34; G02B 7/28
  See application file for complete search history.

(56) References Cited

U.S. PATENT DOCUMENTS

| 2009/0153693 | A1 | 6/2009 | Onuki et al. |
| 2015/0201123 | A1* | 7/2015 | Koguchi ............ H04N 5/23212 348/239 |

FOREIGN PATENT DOCUMENTS

| JP | 11-160612 A | 6/1999 |
| JP | 2007-248615 A | 9/2007 |
| JP | 2008-292622 A | 12/2008 |
| JP | 2009-147665 A | 7/2009 |
| JP | 2012-65294 A | 3/2012 |

OTHER PUBLICATIONS

International Search Report (Form PCT/ISA/210) dated Dec. 27, 2016, for corresponding International Application No. PCT/JP2016/078712, with an English Translation.

Chinese Office Action dated Oct. 8, 2019, for corresponding Chinese Application No. 201680057820.1, with English translation.

* cited by examiner

FIG. 6

IMAGING DEVICE AND CONTROL METHOD THEREFOR USING SHIFT DIRECTION CALCULATION

CROSS-REFERENCE TO RELATED APPLICATIONS

This application is a Continuation of PCT International Application No. PCT/JP2016/078712 filed on 28 Sep. 2016, which claims priority under 35 U.S.C § 119(a) to Japanese Patent Application No. 2015-193514 filed on 30 Sep. 2015. The above application is hereby expressly incorporated by reference, in its entirety, into the present application.

BACKGROUND OF THE INVENTION

1. Field of the Invention

The present invention relates to an imaging device having an electronic view finder or a hybrid view finder and a control method therefor.

2. Description of the Related Art

Recently, imaging devices such as a digital camera having an optical viewfinder (hereinafter referred to as an OVF), an electronic viewfinder (hereinafter referred to as an EVF), and a hybrid viewfinder (refer to JP2012-065294A) are known. The hybrid viewfinder has an OVF mode and an EVF mode, and is capable of switching mode between both modes.

The hybrid viewfinder comprises a display section, a finder window, and a half mirror as an optical path combining section. The display section displays a subject image which is obtained by capturing an optical image of a subject through an imaging element. The optical image of the subject is incident onto the finder window. The half mirror transmits and guides a part of the optical image incident onto the finder window to a finder eyepiece section, and reflects and guides a part of a display image, which is displayed by the display section, to the finder eyepiece section. Further, the hybrid finder has a shutter (hereinafter referred to as an OVF shutter) that blocks the optical image which is incident onto the finder window. In the OVF mode, the OVF shutter is open, the display section is set to a non-display state, and thereby the optical image is guided into the finder eyepiece section. In the EVF mode, the OVF shutter is closed, the display section is set to a display state, and thereby the display image is guided into the finder eyepiece section.

On the other hand, cameras such as a single-lens reflex type camera for experts have a manual focus function that enables a photographer to manually adjust the focus. In addition, in order to facilitate focus adjustment during manual focusing, a digital camera is known in which a part of a subject image is displayed as a split image on a display section in a live view manner (refer to, for example, JP2009-147665A (corresponding to US2009/153693)).

The split image is composed of two subject images (two phase difference images) obtained by capturing an image of a subject by a pupil division method. The shift (phase difference) between the two phase difference images displayed adjacent to each other indicates the amount of shift in focal length for the subject. The two adjacent phase difference images are displayed as images shifted to the left and right in a state where the subject is not in focus (out-of-focus state), and the left and right shifts disappear in a focused state (in-focus state). The photographer is able to bring the subject into focus by operating the focus ring such that the left and right shifts of the two phase difference images disappear.

Digital cameras are configured to display the split image on the rear side display section of the digital camera. Otherwise, in recent years, digital cameras, which are configured to display the image on the display section of the EVF or the hybrid viewfinder, are on sale.

SUMMARY OF THE INVENTION

However, in the digital camera that displays the split image on the display section in the finder, as compared with a digital camera that displays the split image on the rear side display section, the area in which the split image is displayed is small, and thus there is a problem in that it is difficult for a photographer to recognize how much the focus is shifted from the subject.

Therefore, the inventors are studying about a method of displaying a defocus image indicating the amount of defocus of the imaging optical system in the finder instead of the split image. The defocus image is a pair of indicators (for example, a pair of bars) arranged to be spaced in accordance with the amount of defocus.

However, in a case where such a defocus image is displayed in the finder, the position where the defocus image is displayed becomes a problem. Specifically, in a case where a defocus image is displayed at a position close to the center of the observation area of the finder such that a photographer is able to easily view the defocus image, there is a problem that it becomes difficult to observe a subject for focusing. On the other hand, in a case where the defocus image is displayed at the end of the observation area, depending on the position of the eye of the photographer who is in contact with the eyepiece section of the finder, a part of the eyepiece section overlaps with the defocus image, and thus it becomes difficult to recognize the defocus image.

The present invention has an object to provide an imaging device, in which a defocus image can be disposed at an optimum position in a finder, and a control method therefor.

In order to achieve the object, an imaging device of the present invention comprises an imaging optical system, a focus adjustment operation section, an imaging element, a defocus image generation section, a finder section, an eye position detection section, a shift direction calculation section, and a finder display control section. The focus adjustment operation section is capable of performing a focus adjustment operation of the imaging optical system. The imaging element generates a normal image by performing photoelectric conversion on a subject image from the imaging optical system, and generates first and second images by performing photoelectric conversion each of first and second rays which are formed by performing pupil division on the subject image. The defocus image generation section generates a defocus image, which indicates an amount of defocus of the imaging optical system, on the basis of the first and second imaging signals. The finder section is configured to be capable of observing the subject image or the normal image in an observation area. The eye position detection section detects a position of an eye of a photographer who is in contact with the finder section. The shift direction calculation section calculates a direction of shift of the position of the eye with respect to a specific position in the observation area, on the basis of the position of the eye detected by the eye position detection section. The finder display control section displays the defocus image in an area, which is opposed to the direction of shift with respect to the specific position in the observation area, in the observation area.

It is preferable that the observation area has a focus adjustment area, in which the amount of defocus of the imaging optical system is calculated using the first and second imaging signals which are imaging signals obtained on the basis of the first and second rays, and the finder display control section displays the defocus image outside the focus adjustment area and in the area which is opposed to the direction of shift.

It is preferable that the defocus image is indicated by first and second indicators which are spaced from each other in a first direction, and the finder display control section decreases a first distance, which is a distance between the first and second indicators in the first direction, as the amount of defocus decreases.

It is preferable that the first and second indicators are spaced from each other in a second direction orthogonal to the first direction, and the finder display control section decreases a second distance, which is a distance between the first and second indicators in the second direction, as the amount of defocus decreases.

It is preferable that the finder display control section sets the first and second distances to 0 in a case where the amount of defocus is 0. It is preferable that the finder display control section integrally displays the first and second indicators in a case where the amount of defocus is 0.

It is preferable that a part of the first indicator, which faces the second indicator in the second direction, has a convex portion, a part of the second indicator, which faces the first indicator in the second direction, has a concave portion, and in a case where the amount of defocus is 0, the convex portion and the concave portion are fitted.

It is preferable that the imaging device further comprises a determination section determines whether the amount of defocus is within a focal depth of the imaging optical system, in which the finder display control section changes the second distance depending on the amount of defocus in a case where the determination section determines that the amount of defocus is within the focal depth, and keeps the second distance constant regardless of the amount of defocus in a case where the determination section determines that the amount of defocus is outside the focal depth.

It is preferable that the eye position detection section detects the position of the eye in each of a vertical direction and a horizontal direction, and the finder display control section displays the defocus image in an area which is opposed to the direction of shift in the vertical direction, and in an area which is opposed to the direction of shift in the horizontal direction. Further, it is preferable that the specific position is at a center of the observation area.

A control method for controlling the imaging device of the present invention comprises: an eye position detection step of detecting a position of an eye of a photographer who is in contact with the finder section; a shift direction calculation step of calculating a direction of shift of the position of the eye with respect to a specific position in the observation area, on the basis of the position of the eye detected by the eye position detection step; and a finder display control step of displaying the defocus image in an area, which is opposed to the direction of shift with respect to the specific position in the observation area, in the observation area.

According to the present invention, the defocus image can be disposed at the optimum position in the finder.

BRIEF DESCRIPTION OF THE DRAWINGS

FIG. 6 is an explanatory diagram illustrating an example of a pixel array of an imaging element.

DESCRIPTION OF THE PREFERRED EMBODIMENTS

Figure 1:
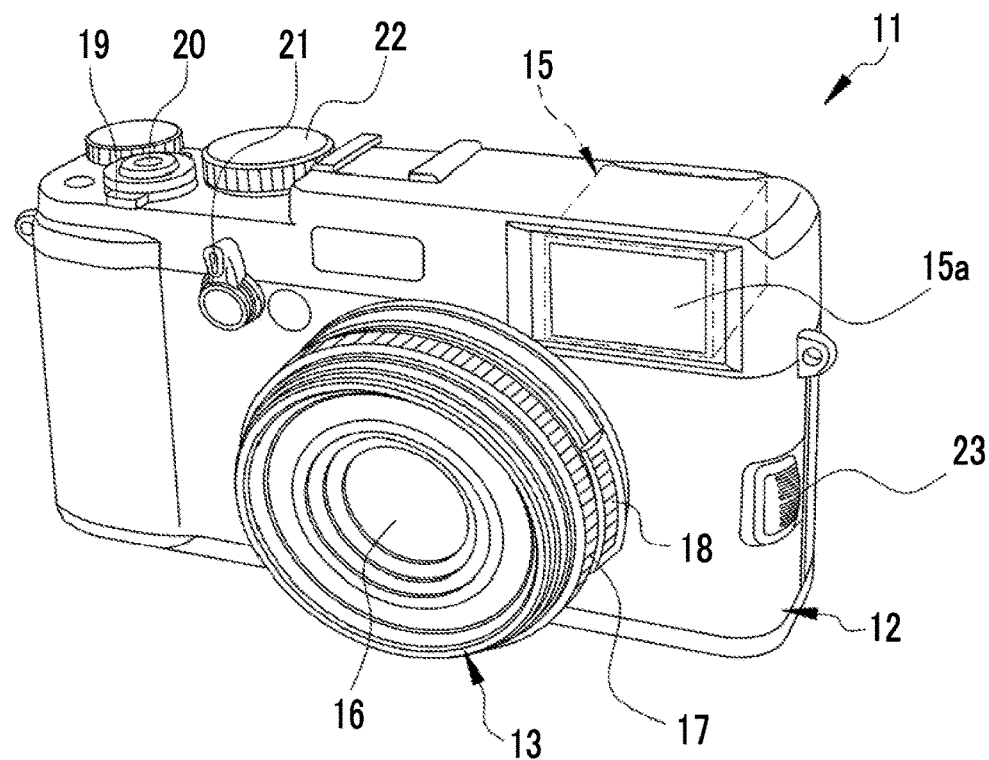
FIG. 1 is a front view of the digital camera.
Figure 2:
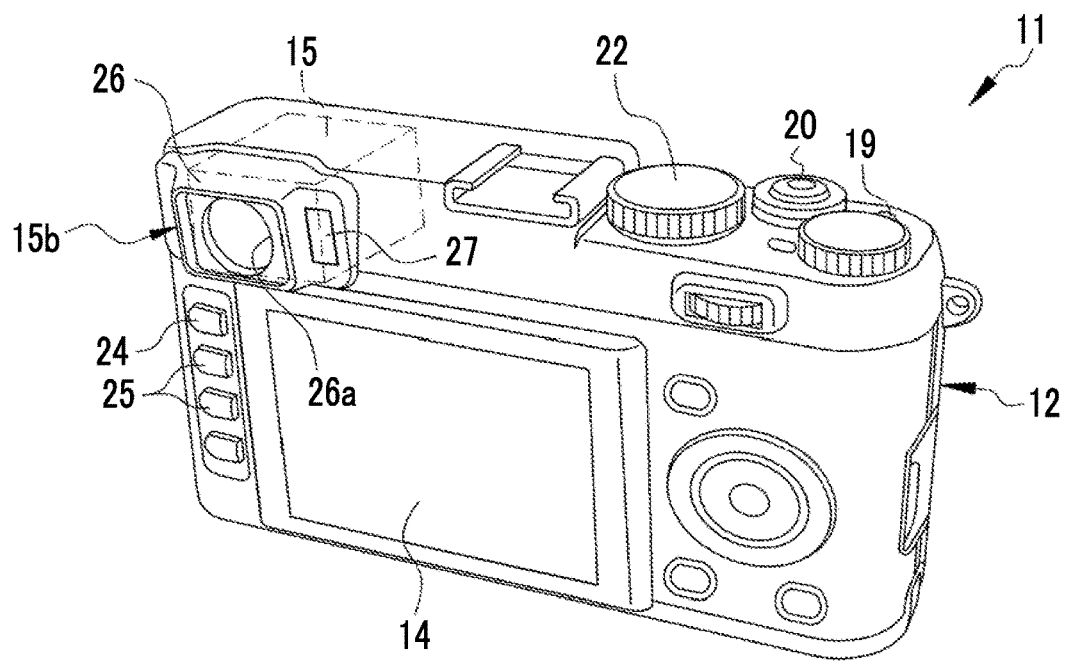
FIG. 2 is a perspective view of the rear side of the digital camera.

[First Embodiment]
In FIGS. 1 and 2, a digital camera 11 comprises a camera body 12, a lens barrel 13, a rear side display section 14, and a finder section 15. The lens barrel 13 is provided on the front side of the camera body 12 so as to hold an imaging optical system 16. On the outer periphery of the lens barrel 13, a focus ring 17 (focus adjustment operation section) and a stop ring 18 are rotatably provided. The focus ring 17 and the stop ring 18 are operation members capable of performing focus adjustment and stop adjustment respectively by manually rotating the rings by a photographer.

The finder section 15 is a hybrid type capable of switching between an optical viewfinder (OVF) mode and an electronic viewfinder (EVF) mode.

On the upper side of the camera body 12, a power button 19, a release button 20, a shutter dial 22, and the like are provided. On the front side of the camera body 12, a finder switch lever 21, an auto focus/manual focus (AF/MF) changeover switch 23, and the like are provided. On the rear side of the camera body 12, a mode button 24, a zoom button 25, and the like are provided.

The AF/MF changeover switch 23 is a switch for switching the mode for performing the focus adjustment of the imaging optical system 16 between the auto focus mode and the manual focus mode. In the auto focus mode, focus adjustment of the imaging optical system 16 is automatically performed. In the manual focus mode, it is possible for a photographer to manually perform the focus adjustment by rotating the focus ring 17. Switching between the auto focus mode and the manual focus mode can be performed not only by operation of the AF/MF changeover switch 23 but also by operation of the mode button 24 or the like as described later.

The power button 19 is operated in a case where a power source (not shown in the drawing) of the digital camera 11 is turned on/off. The release button 20 is operated in a case where imaging is performed. The finder switch lever 21 is operated in a case where the finder section 15 is switched between the OVF mode and the EVF mode. The shutter dial 22 is operated in a case where the shutter speed of the digital camera 11 is switched. The zoom button 25 is operated in a case where zooming is performed.

The release button 20 has a two-stage-stroke-type switch (not shown in the drawing) including a S1 switch and a S2 switch. The digital camera 11 performs an imaging preparation operation such as an automatic exposure adjustment in a case where the release button 20 is pressed down (pressed halfway) and the S1 switch is turned on. From this state, in a case where the release button 20 is further pressed down (pressed fully) and the S2 switch is turned on, the imaging operation is performed.

The rear side display section 14 is provided on the rear side of the camera body 12, and displays images acquired in various imaging modes and a menu screen for performing various settings.

Further, a slot (not shown in the drawing) for mounting a recording medium 55 (refer to FIG. 3) to be described later is provided on the bottom of the camera body 12.

The finder section 15 has a finder objective window 15a, which includes an optical image of a subject, and a finder eyepiece section 15b with which an eye of a photographer comes into contact. The finder objective window 15a is provided on the front side of the camera body 12. The finder eyepiece section 15b is provided on the rear side of the camera body 12.

The finder eyepiece section 15b comprises an eye cup section 26 and an eye sensor 27. The eye cup section 26 is a section for being in contact with the periphery of the eyes of a photographer. The eye cup section 26 has a substantially rectangular frame-like outer shape, and a finder eyepiece window 26a is formed therein. The finder eyepiece window 26a is formed in a circular shape, and exposes the inside of the finder section 15.

The eye sensor 27 consists of an optical sensor or the like, and is disposed on the side portion of the eye cup section 26 around the finder eyepiece window 26a, on the right side of the eye cup section 26 in the present embodiment. The eye sensor 27 is a well-known eye position detection section, and detects, for example, a position P of an eye of a photographer who is in contact with the finder section 15, in accordance with the amount of light received by the optical sensor.

Figure 3:
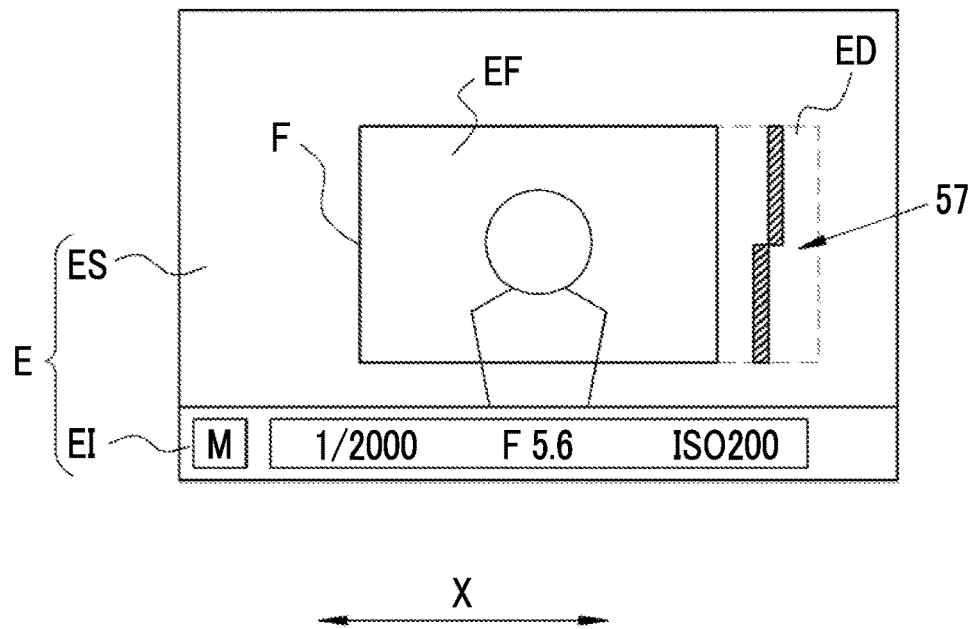
FIG. 3 is a view illustrating an inside of an observation area of a finder section.

As shown in FIG. 3, a focus adjustment area EF (an area indicated by a rectangular frame F) is set in the observation area E in the finder section 15. A defocus image 57 to be described later is displayed at a position close to the focus adjustment area EF.

In the manual focus mode, in a case where a photographer adjusts the focus of the imaging optical system 16 by rotating the focus ring 17, the defocus image 57 changes in accordance with the amount of defocus. The photographer is able to recognize the focus state in the focus adjustment area EF on the basis of the defocus image 57. In the present embodiment, the observation area E is divided into a subject display area ES and an information display area EI. The focus adjustment area EF is positioned at the center of the subject display area ES, and is a rectangular area smaller than the subject display area ES. The subject display area ES is an area in which an optical image of the subject or a normal image 56 can be observed as described later.

In the information display area EI, an information image is displayed. The information image is generated on the basis of imaging information such as imaging conditions, the imaging mode, and the like. The imaging conditions include a shutter speed, an aperture value, an ISO sensitivity, and the like. The imaging mode includes an auto imaging mode, a manual imaging mode, and the like. In the auto imaging mode, focus adjustment and automatic exposure adjustment are performed on the basis of image data obtained by capturing an optical image, and the focus, the shutter speed, and the aperture value are automatically set. In the manual imaging mode, a photographer rotates the focus ring 17 so as to adjust the focus, and the photographer operates the shutter dial 22, the stop ring 18, and the like so as to manually set the shutter speed and the aperture value. The imaging mode can be set by operating the mode button 24 or the like.

In the information display area EI shown in FIG. 3, the following are displayed: "1/2000" that indicates the shutter speed as an example of the imaging information, "F5.6" that indicates the aperture value, "ISO200" that indicates the ISO sensitivity, and "M" that indicates the imaging modes.

Figure 4:
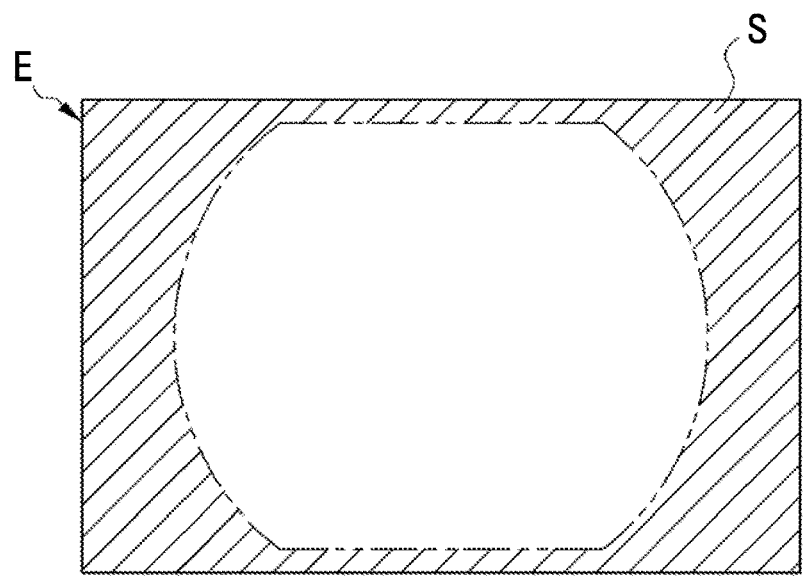
FIG. 4 is an explanatory diagram illustrating a part hidden by an outer frame and an edge portion of a finder eyepiece section in an observation area.

As described above, the eye cup section 26 is formed in the finder eyepiece section 15b. For this reason, as shown in FIG. 4, in a part of the observation area E in the finder section 15, a part S (area indicated by hatching) hidden by the frame portion of the eye cup section 26 and the edge portion of the finder eyepiece window 26a is present, and thus a photographer may not be able to visually perceive the hidden part. For example, in a case where the eye position P (refer to FIG. 5) of the photographer is positioned on the right side of the eye cup section 26, the right side of the observation area E is hidden by the edge portion. Conversely, in a case where the eye position P of the photographer is positioned on the left side of the eye cup section 26, the left side of the observation area E is hidden by the edge portion. The area hidden by the edge portion can not be visually perceived by the photographer.

Figure 5:
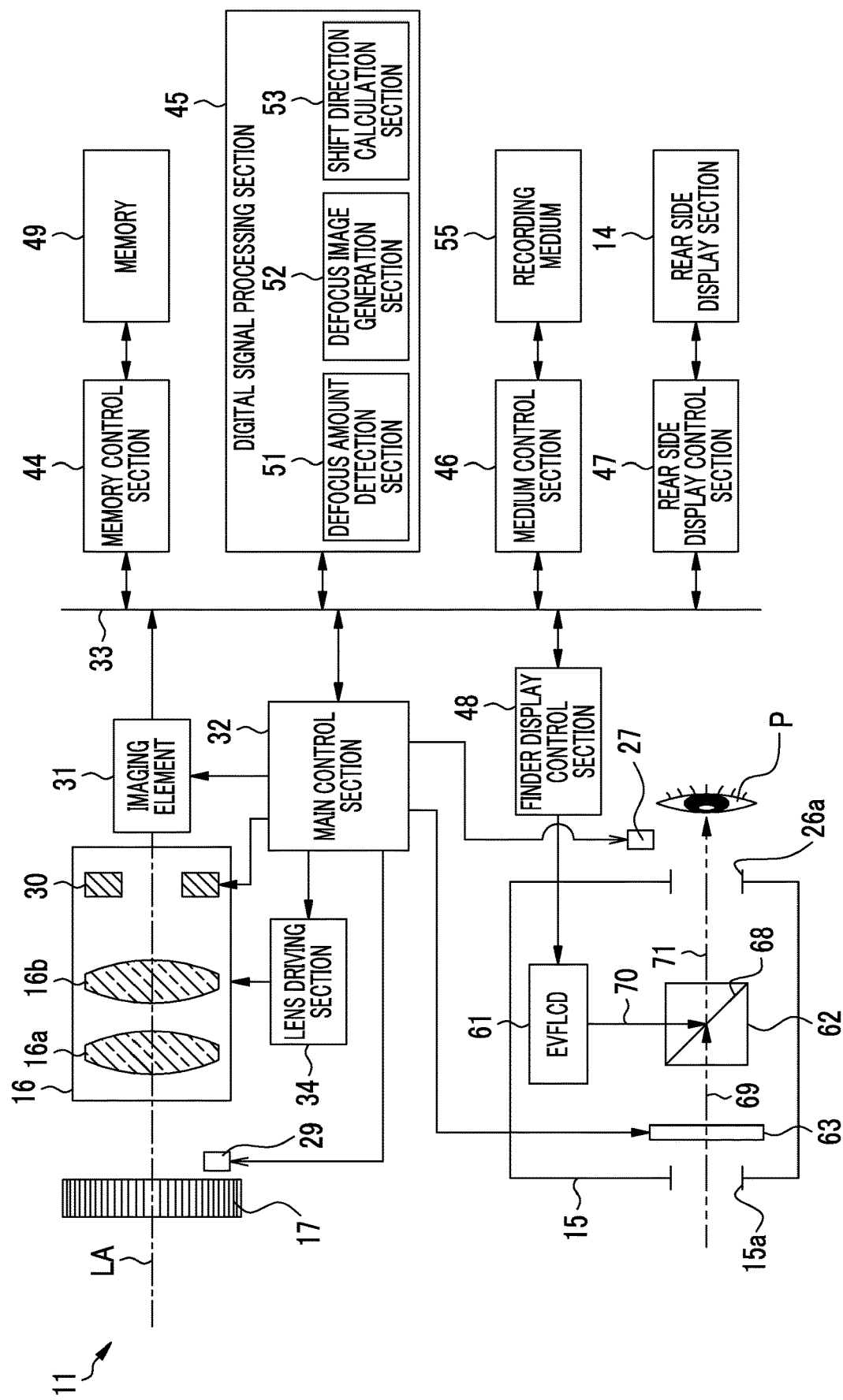
FIG. 5 is a block diagram illustrating an electrical configuration of the digital camera.

In FIG. 5, the lens barrel 13 comprises a sensor 29 in addition to the imaging optical system 16, the focus ring 17, and the like. In the manual focus mode, the sensor 29 detects the rotation direction and the amount of rotation of the focus ring 17. The sensor 29 is composed of, for example, a comb tooth ring (not shown) provided on the inner peripheral surface of the focus ring 17 and an optical sensor (not shown) outputting a detection signal. The detection signal from the sensor 29 is output to the main control section 32. The main control section 32 detects the rotation direction and the amount of rotation of the focus ring 17 on the basis of the detection signal which is input from the sensor 29.

The imaging optical system 16 comprises a plurality of lenses including a zoom lens 16a and a focus lens 16b, a stop 30, and the like. Behind the imaging optical system 16, the imaging element 31 is arranged along the optical axis LA of the imaging optical system 16. The imaging element 31 is provided inside the camera body 12.

The stop 30 adjusts an amount of light, which is incident into the imaging element 31, through driving control performed by the main control section 32. An optical image of a subject, which passes through the imaging optical system 16 and of which an amount of light is adjusted through the stop 30, is incident into the imaging element 31.

A lens driving section 34 is connected to the imaging optical system 16. The main control section 32 transmits a control signal for moving the focus lens 16b to the lens driving section 34 in accordance with the rotation direction and the amount of rotation of the focus ring 17 detected on the basis of the signal of the sensor 29. The lens driving section 34 moves the focus lens 16b on the basis of the control signal.

In addition, the main control section 32 controls the lens driving section 34 so as to move the zoom lens in the optical axis direction, thereby causing the imaging optical system 16 to perform zooming.

The imaging element 31 is, for example, a CMOS type image sensor having a single-plate color imaging type which has a RGB color filter. The imaging element 31 has a light receiving surface 31a formed of a plurality of pixels arranged in a two-dimensional matrix shape. Each pixel includes a photoelectric conversion element, and photoelectrically converts an optical image, which is formed on the light receiving surface, so as to generate an imaging signal. Further, the imaging element 31 has an electronic shutter function, and a shutter speed (electric charge accumulation time period) thereof can be adjusted.

Figure 6:
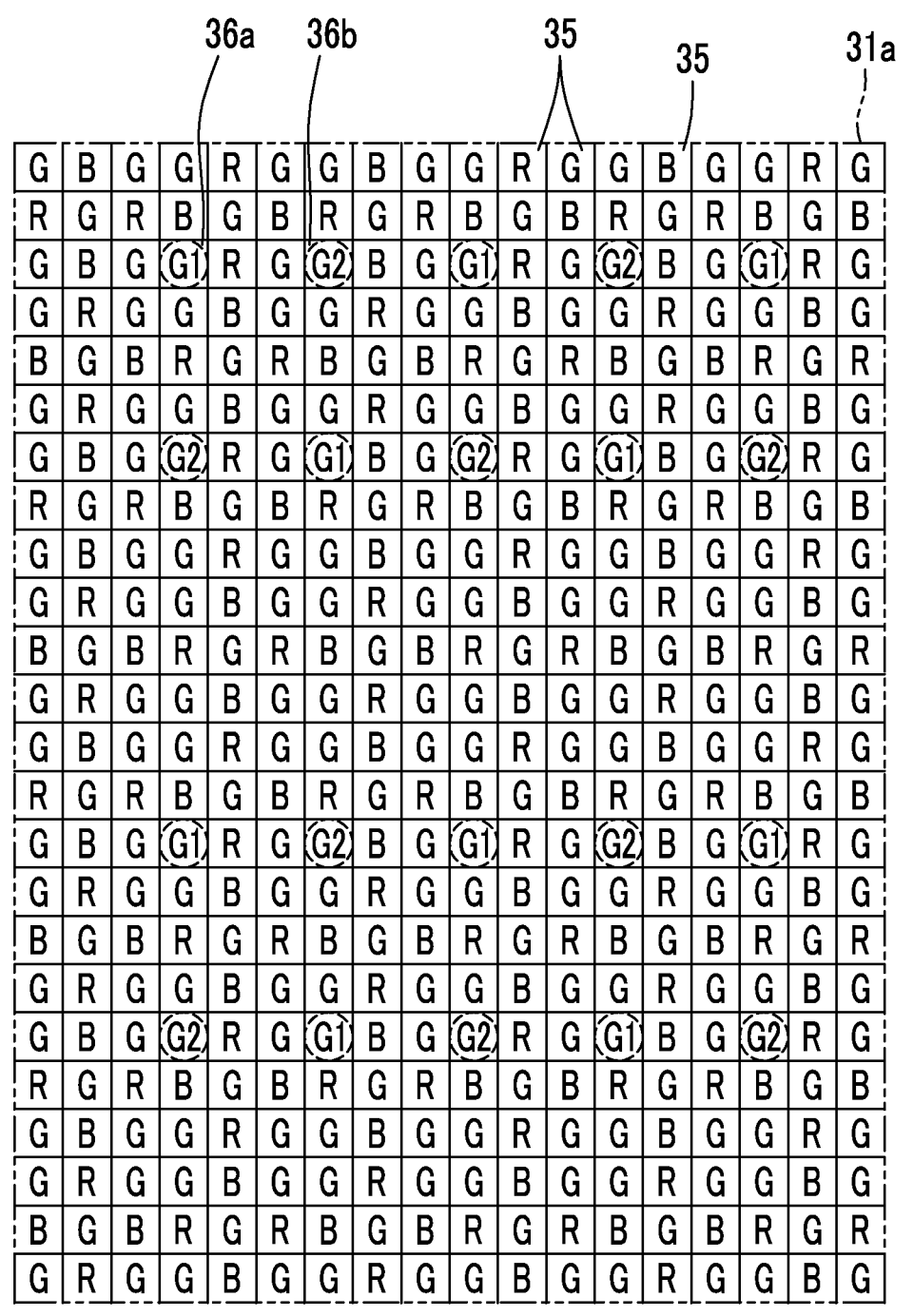

Subject light, which is transmitted through the imaging optical system 16, is incident onto the light receiving surface 31a of the imaging element 31 shown in FIG. 6. On the light receiving surface 31a, normal pixels 35, first phase difference pixels 36a, and second phase difference pixels 36b are provided. The normal pixels 35, the first phase difference pixels 36a, and the second phase difference pixels 36b are arranged in a matrix shape as a whole, photoelectrically convert each part of the image, and output an imaging signal. The imaging element 31 is operated by a drive signal from the main control section 32.

There are many normal pixels 35 on the light receiving surface 31a. The normal pixel 35 is a normal pixel that receives rays from a subject without pupil division. A color filter 41 (refer to FIG. 7) of any one of red (R), green (G), and blue (B) is provided in each normal pixel 35. "R" in FIG. 6 indicates an R pixel which is the normal pixel 35 provided with an R filter. "G" indicates a G pixel which is a normal pixel 35 provided with a G filter. "B" indicates a B pixel which is a normal pixel 35 provided with a B filter.

On the other hand, instead of some of the G pixels, the first phase difference pixels 36a (corresponding to "G1" in FIG. 6) and the second phase difference pixels 36b (corresponding to "G2" in FIG. 6), which pupil-divide and receive rays from the subject, are arranged on the light receiving surface 31a in a predetermined pattern. In the present embodiment, the first phase difference pixels 36a and the second phase difference pixels 36b are alternately provided at predetermined distances in each of the horizontal and vertical directions. It should be noted that the first and second phase difference pixels 36a and 36b may be disposed only in the area corresponding to the focus adjustment area EF.

Figure 7:
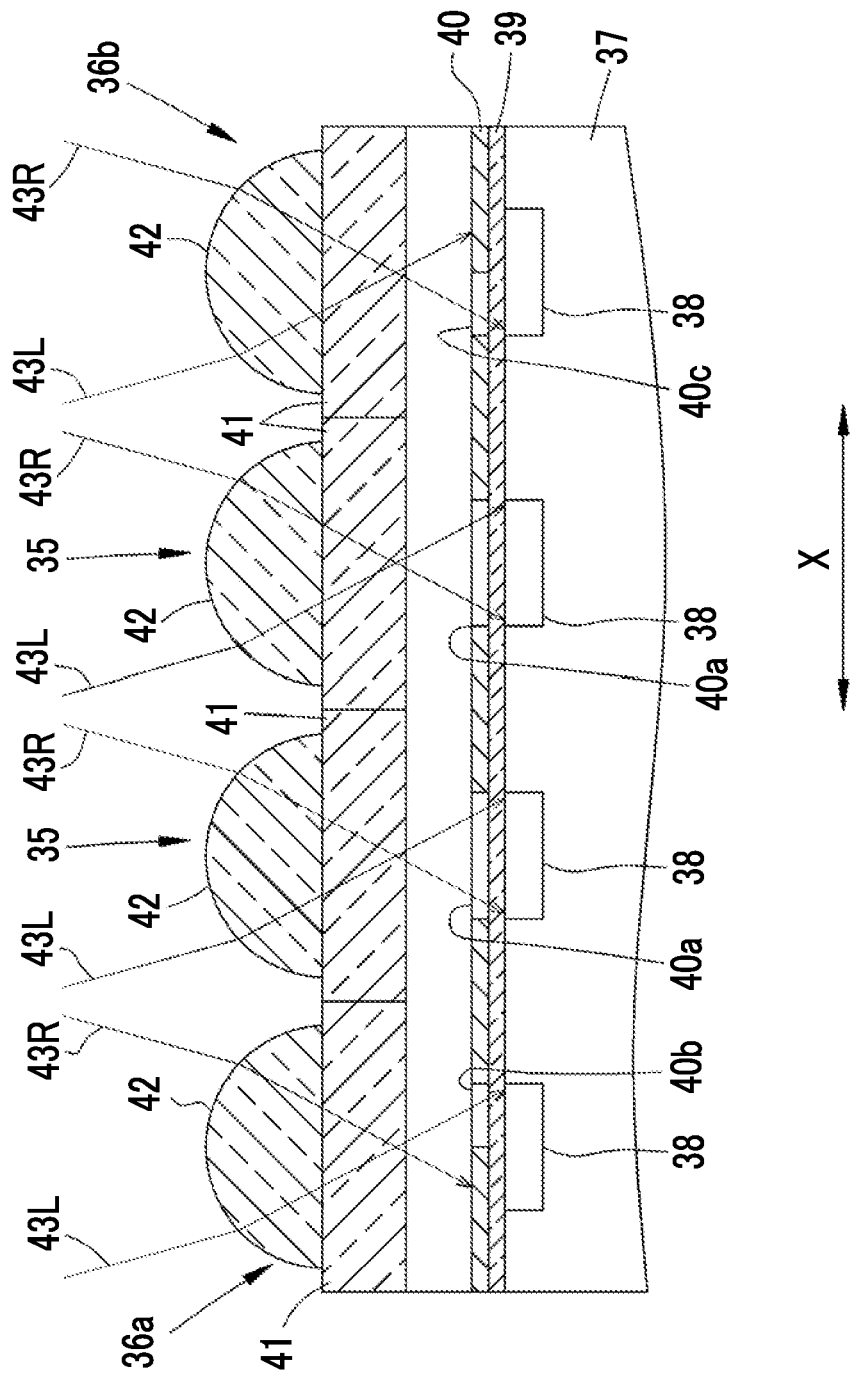
FIG. 7 is a cross-sectional view illustrating structures of a normal pixel and first and second phase difference pixels.

In FIG. 7, each of the pixels 35, 36a, and 36b has a photodiode 38 formed on a semiconductor substrate 37. The photodiode 38 is a photoelectric conversion section that converts incident light into signal charge corresponding to the amount of received light and accumulates the charge. A transparent insulation film 39 is formed on the surface of the semiconductor substrate 37, and a light blocking film 40 is formed thereon. In the light blocking film 40, a normal opening 40a is formed on the photodiode 38 of the normal pixel 35. The normal opening 40a has the same rectangular shape as that of the photodiode 38, but its size is smaller than that of the photodiode 38, and the center thereof is provided at a position coinciding with the center of the photodiode 38.

In the light blocking film 40, a first eccentric opening 40b is formed on the photodiode 38 of the first phase difference pixel 36a, and a second eccentric opening 40c is formed on the photodiode 38 of the second phase difference pixel 36b. The first eccentric opening 40b of the first phase difference pixel 36a is positioned to be shifted to the right with respect to the center of the photodiode 38, and the second eccentric opening 40c of the second phase difference pixel 36b is positioned to be shifted to the left with respect to the center of the photodiode 38.

The eccentric direction of each of the eccentric openings 40b and 40c is the horizontal direction X of the observation area E. This is for forming a phase difference in the horizontal direction X of the observation area E.

A color filter 41 of any of the three primary colors (R, G, B) is provided above the light blocking film 40, and microlenses 42 are further provided on each color filter 41. The color filter 41, which transmits green light, is provided on each of the first phase difference pixel 36a and the second phase difference pixel 36b.

With the above-mentioned configuration, the first phase difference pixel 36a receives only the rays 43L (first rays) from the left side portion obtained by dividing the exit pupil of the imaging optical system 16. The second phase difference pixel 36b receives only rays 43R (second rays) from the right side portion. The normal pixel 35 receives rays from the imaging optical system 16 without pupil division.

The imaging element 31 comprises a denoising circuit, an auto gain controller, and a signal processing circuit such as an A/D conversion circuit (any of those is not shown in the drawing). The denoising circuit performs denoising processing on the imaging signal. The auto gain controller amplifies a level of the imaging signal to an optimum value. The A/D conversion circuit converts the imaging signal into a digital signal, and outputs the signal from the imaging element 31. The output signal of the imaging element 31 is image data (so-called RAW data) having one pixel value for each of the pixels 35, 36a, and 36b.

The imaging element 31 and the main control section 32 are connected to a bus 33. Otherwise, a memory control section 44, a digital signal processing section 45, a medium control section 46, a rear side display control section 47, and a finder display control section 48 are connected to the bus 33.

A memory 49 for a temporary storage such as SDRAM is connected to the memory control section 44. The memory control section 44 inputs the image data, which is output from the imaging element 31, to the memory 49, and stores the image data. Further, the memory control section 44 outputs the image data, which is stored in the memory 49, to the digital signal processing section 45.

The digital signal processing section 45 performs known image processing such as matrix calculation, demosaic processing, γ correction, luminance conversion, color difference conversion, resizing processing, and the like on the image data which is input from the memory 49, thereby generating a subject image on the basis of the pixel values of the normal pixels 35. Hereinafter, the subject image generated on the basis of the normal pixels 35 is referred to as a normal image 56. The normal image 56 is a color image in which all the pixels have pixel values of three colors through the synchronization processing.

Further, the digital signal processing section 45 is composed of a defocus amount detection section 51, a defocus image generation section 52, and a shift direction calculation section 53. The defocus amount detection section 51 acquires the first imaging signal, which is generated by the first phase difference pixels 36a in the focus adjustment area EF, and the second imaging signal, which is generated by the second phase difference pixels 36b, detects an amount of phase difference between both of those, and calculates the amount of defocus of the imaging optical system 16 from the amount of phase difference.

Figure 8A:
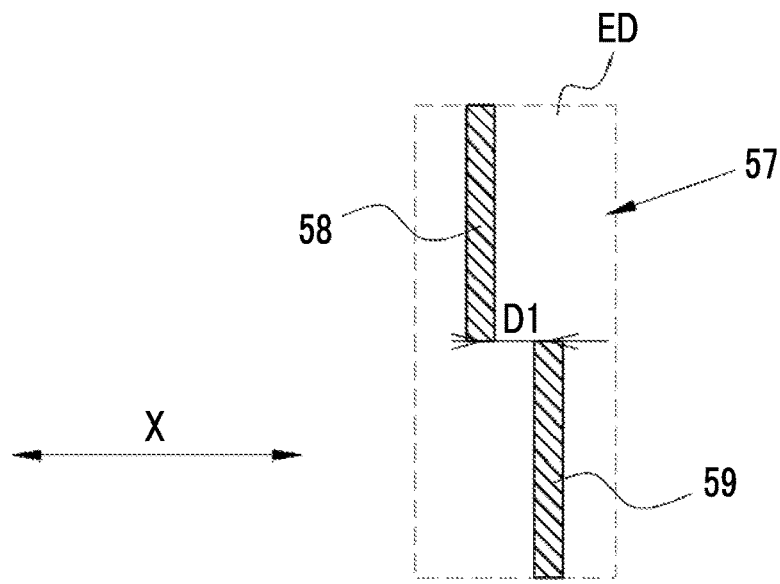
FIG. 8A is an explanatory diagram illustrating a defocus image in an out-of-focus state.
Figure 8B:
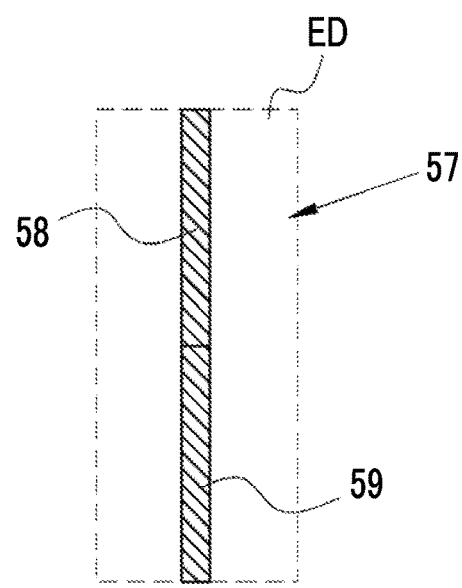
FIG. 8B is an explanatory diagram illustrating a defocus image in an in-focus state.

The defocus image generation section 52 generates the defocus image 57 on the basis of the amount of defocus calculated by the defocus amount detection section 51. This defocus image 57 is displayed on a liquid crystal display device (EVFLCD) 61 of a finder section 15 to be described later. As shown in FIG. 8A, the defocus image 57 is indicated by first and second indicators 58 and 59 that are spaced from each other in the horizontal direction X (first direction). The first distance D1, which is a distance between the first and second indicators 58 and 59 in the horizontal direction X across the first and second indicators 58 and 59, indicates the amount of defocus of the imaging optical system 16. The first distance D1 is smaller as the amount of defocus is smaller. In FIGS. 3, 8A, and 8B, the defocus image display area ED including the defocus image 57 is indicated by a rectangular frame (a rectangular frame indicated by a dashed line), but this rectangular frame is a virtual line. In the present embodiment, the rectangular frame is not actually shown, but may be indicated by a solid line or the like. This also applies to the following drawings.

The defocus image generation section 52 generates the defocus image 57 whenever the first and second imaging signals are obtained. In the manual focus mode, in a case where focus adjustment of the imaging optical system 16 is performed by rotating the focus ring 17, the defocus image 57 changes in accordance with the change in the amount of defocus. The photographer is able to recognize the focus state of the imaging optical system 16 on the basis of the first distance D1 of the defocus image 57.

In a case where the amount of defocus is "0", that is, in a case where the imaging optical system 16 is brought into focus by the rotation operation of the focus ring 17, as shown in FIG. 8B, the first distance D1 is "0", and the first and second indicators 58 and 59 are aligned in a straight line.

As described above, the eye sensor 27 detects the eye position P of the photographer. Specifically, the eye sensor 27 detects the eye position P in the vertical direction and the horizontal direction, and transmits the detected position to the main control section 32. On the basis of the eye position P detected by the eye sensor 27, the shift direction calculation section 53 calculates a direction of shift of a specific position in the observation area E, for example, a eye position P with respect to the center of the observation area E. The main control section 32 transmits information, which indicates the direction of shift of the eye position P calculated by the shift direction calculation section 53, to the finder display control section 48.

The medium control section 46 controls recording and reading of image files into and from the recording medium 55. The recording medium 55 is, for example, a memory card into which a flash memory is built. The medium control section 46 records the image data compressed by the digital signal processing section 45 on the recording medium 55.

The rear side display control section 47 controls image display on the above-mentioned rear side display section 14. Specifically, the rear side display control section 47 generates a video signal complying with the NTSC standard on the basis of the image data, which is generated by the digital signal processing section 45, and outputs the signal to the rear side display section 14.

The finder display control section 48 generates a video signal on the basis of the image data in a manner similar to that of the rear side display control section 47, and outputs the signal to the EVFLCD 61.

In the finder section 15, an EVFLCD 61, a prism 62, and an OVF shutter (optical shutter) 63 are provided.

The EVFLCD 61 corresponds to the above-mentioned observation area E, and a subject display area ES, on which a subject image is displayed, and an information display area EI, on which an information image is displayed, are set thereon. Further, in the subject display area ES, a rectangular display frame F indicating the focus adjustment area EF and a defocus image display area ED are set. The information display area EI is set in a rectangular shape along the lower end of the subject display area ES. The subject image is a normal image 56 generated by the digital signal processing section 45. Further, the information image is generated by the main control section 32.

A half mirror 68 as the optical path combining section is formed inside the prism 62. The half mirror 68 is disposed to form an angle of 45 degrees with respect to the first optical path 69, through which the optical image of the subject incident onto the finder objective window 15a propagates, and the second optical path 70 through which the display image displayed on the EVFLCD 61 propagates. The half mirror 68 obtains a third optical path 71 by combining the first optical path 69 and the second optical path 70. The finder eyepiece window 26a is disposed on the third optical path 71.

The half mirror 68 transmits a part of the optical image, which propagates on the first optical path 69, so as to guide the image into the third optical path 71, and reflects a part of the display image, which propagates on the second optical path 70, so as to guide the image into the third optical path 71. Thereby, the optical image and the display image are guided into the finder eyepiece section 15b.

The OVF shutter 63 is a liquid crystal shutter, and is disposed on the first optical path 69. The OVF shutter 63 is controlled by the main control section 32 such that it switches between "a closed state", in which the optical image incident from the finder objective window 15a is not incident into the prism 62 by blocking light of the optical image, and "an open state" in which the optical image is transmitted and incident into the prism 62. The OVF shutter 63 is set to the "open state" in the OVF mode, and is set to the "closed state" in the EVF mode.

The EVFLCD 61 has a backlight and a liquid crystal panel (both not shown), the backlight emits light to the liquid crystal panel, and images are displayed by light transmitted through the liquid crystal panel.

The finder display control section 48 generates video signals different in the EVF mode and the OVF mode. In the EVF mode, the finder display control section 48 generates a video signal, on the basis of the normal image 56, the defocus image 57, and the information image. Specifically, the finder display control section 48 grasps the area information of the subject display area ES and the information display area EI of the EVFLCD 61, displays the normal image 56 and the rectangular frame F indicating the focus adjustment area EF in the subject display area ES, displays the defocus image 57 in the defocus image display area ED, and generates a video signal for displaying the information image in the information display area EI. Regarding signal values of parts corresponding to the information display area EI of the video signal, signal values of a part indicating imaging information such as texts are at the maximum gray (white) level, and signal values of the other part are at the minimum gray (black) level.

On the other hand, in the OVF mode, the finder display control section 48 generates a video signal, on the basis of the defocus image 57 and the information image. Specifically, the finder display control section 48 hides the subject display area ES excluding the rectangular frame F indicating the focus adjustment area EF and the defocus image display area ED, and generates a video signal for displaying the rectangular frame F, the defocus image 57 in the defocus image display area ED, and the information image in the information display area EI.

The EVFLCD 61 changes light transmittances of liquid crystal cells, on the basis of the input video signals. Specifically, the light transmittances of the liquid crystal cells are set as transmittances corresponding to respective signal values of the video signal. In particular, a signal value is set as the minimum transmittance, at the black level, and is set as the maximum transmittance, at the white level.

In the case of generating the video signal in the EVF mode and the OVF mode, the finder display control section 48 changes the position at which the defocus image 57 is displayed in accordance with the direction of shift of the eye position P calculated by the shift direction calculation section 53. That is, the finder display control section 48 displays the defocus image 57 in an area, which is opposed to the direction of shift of the eye position P with respect to the specific position in the observation area E, for example, the center of the observation area E, in the subject display area ES. In addition, the finder display control section 48 displays the defocus image 57 outside the focus adjustment area EF and at positions close to the focus adjustment area EF. Here, the term "close" is not limited to a state in which the defocus image 57 is in contact with the focus adjustment area EF, and the defocus image 57 may be spaced to some extent from the focus adjustment area EF. For example, assuming that the width of the focus adjustment area EF in the horizontal direction X is W1 (refer to FIGS. 9A and 9B), a state, in which the defocus image 57 is displayed within the range of the width W1 from the side of the focus adjustment area EF, is defined as an close range state.

Figure 9A:
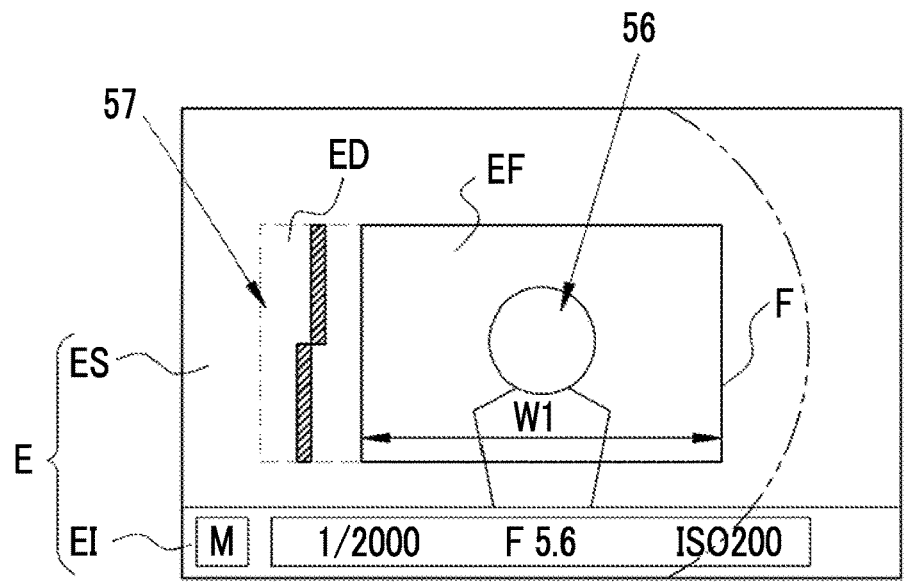
FIG. 9A is an explanatory diagram illustrating an example in which a defocus image is displayed on the left side with respect to the center of the observation area in a case where the direction of shift of the eye position is the right direction.
Figure 9B:
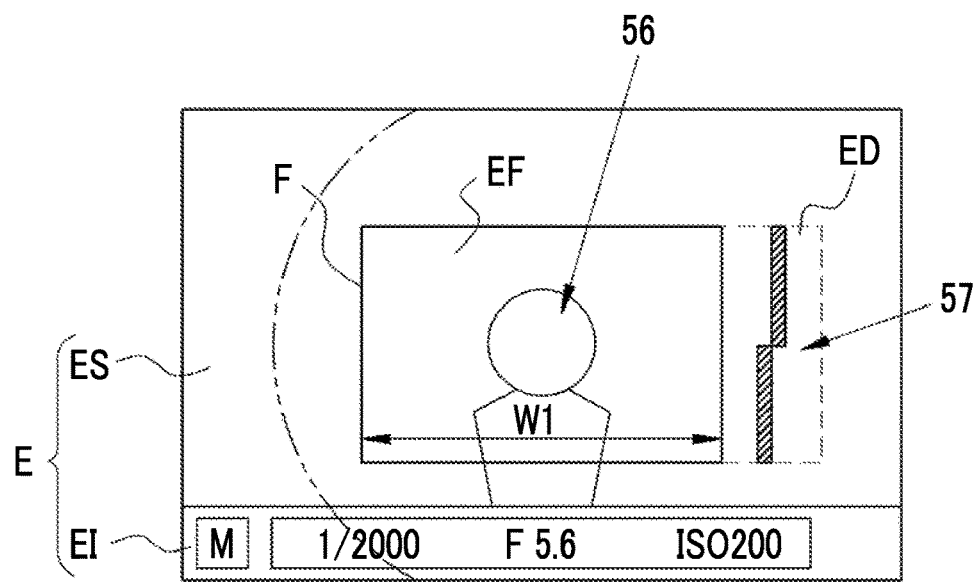
FIG. 9B is an explanatory diagram illustrating an example in which a defocus image is displayed on the right side with respect to the center of the observation area in a case where the direction of shift of the eye position is the left direction.

For example, in a case where the direction of shift of the eye position P is the right direction, the defocus image 57 is displayed at a position close to the left side of the rectangular frame F indicating the focus adjustment area EF, as shown in FIG. 9A. In a case where the direction of shift of the eye position P is the left direction, the defocus image 57 is displayed at a position close to the right side of the rectangular frame F as shown in FIG. 9B.

As described above, in the EVF mode, the normal image 56 and the rectangular frame F are displayed in the subject display area ES of the EVFLCD 61, the defocus image 57 is displayed in the defocus image display area ED, and the information image is displayed in the information display area EI. As a result, the subject image, the rectangular frame F, the information image, the defocus image 57, and the like shown in FIG. 3 are guided to the observation area E of the finder eyepiece window 26a.

Figure 10:
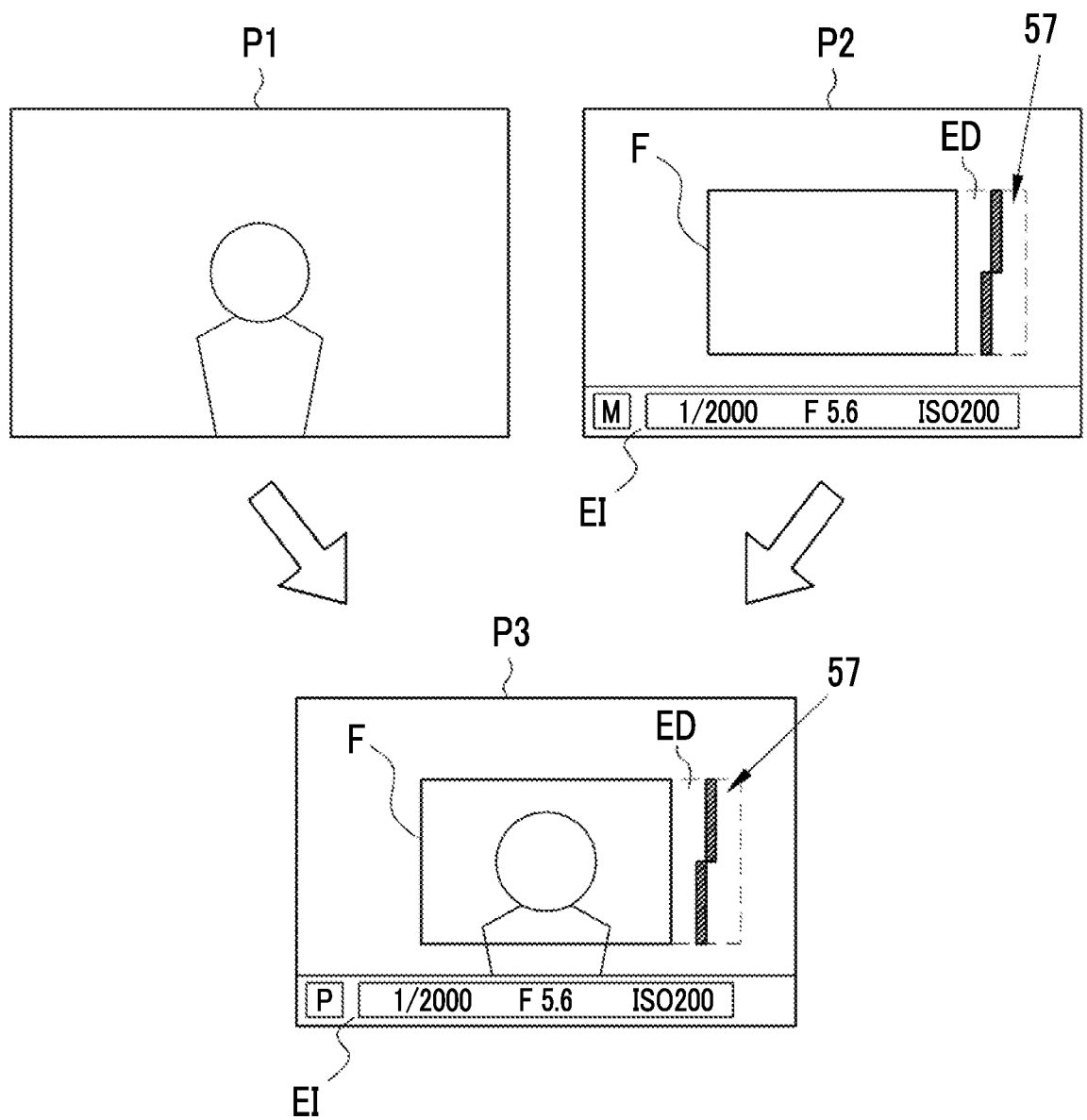
FIG. 10 is a diagram illustrating an OVF image in which an optical image and an information image overlap.

On the other hand, in the OVF mode, the normal image 56 is not displayed in the subject display area ES except for the rectangular frame F and the defocus image display area ED, and the subject display area ES is displayed in black. In the OVF mode, the defocus image 57 is displayed in the defocus image display area ED, and an information image is displayed in the information display area EI. In the OVF mode, since the OVF shutter 63 is set to the "opened state", the optical image is transmitted through the OVF shutter 63, propagates on the first optical path 69, is transmitted through the half mirror 68, and is guided into the third optical path 71. As a result, as shown in FIG. 10, in the OVF image P3, the optical image P1 overlaps with the image P2 consisting of the information image, the defocus image 57, and the rectangular frame F. The OVF image P3 is guided into observation area E of a finder eyepiece window 26a.

Figure 11:
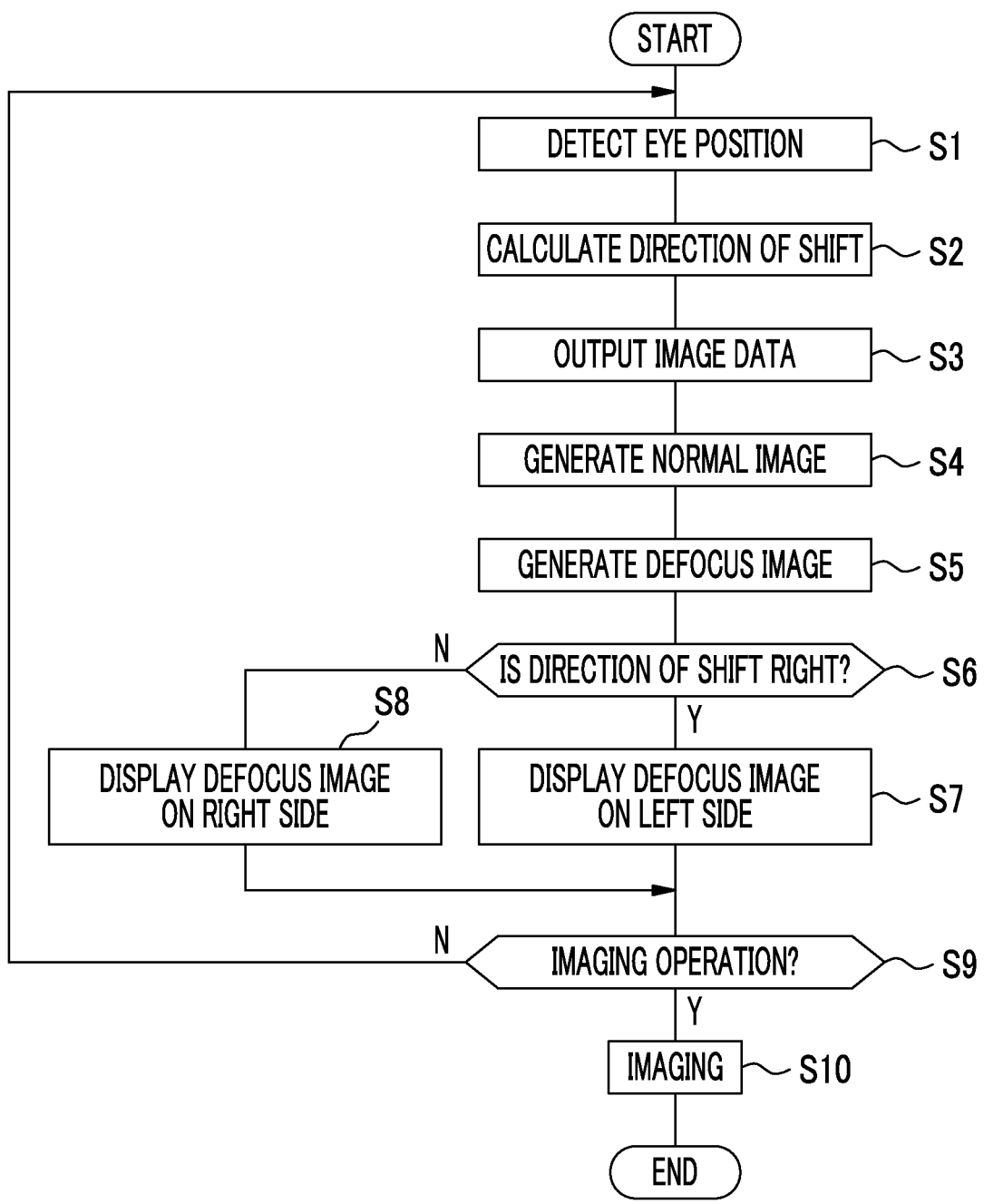
FIG. 11 is a flowchart explaining processing of displaying a defocus image at the time of imaging.

Next, operations of the digital camera 11 will be described with reference to the flowchart shown in FIG. 11. First, in a case where a photographer operates the power button 19 so as to turn on the power, a power supply voltage is supplied to each section of the digital camera 11. Furthermore, in a case where the mode button 24 is operated and the imaging mode is selected, the imaging element 31 and the finder section 15 start operating. In the flowchart shown in FIG. 11, a case where the setting of the finder switch lever 21 is the EVF mode and the setting of the AF/MF changeover switch 23 is the manual focus mode will be described.

In a case where the finder section 15 starts to operate, the eye sensor 27 first detects the eye position P of the photographer and transmits the position to the main control section 32 (S1). The shift direction calculation section 53 of the main control section 32 calculates the direction of shift of the eye position P with respect to the center of the observation area E on the basis of the eye position P detected by the eye sensor 27, and transmits information, which indicates the calculated direction of shift, to the finder display control section 48 (S2).

In a case where the imaging element 31 starts to operate, a subject image is incident onto the light receiving surface 31a through the imaging optical system 16, and photoelectrically converted by the normal pixel 35, the first phase difference pixel 36a, and the second phase difference pixel 36b, and the image data is output (S3).

The image data temporarily stored in the memory 49 is output to the digital signal processing section 45. The digital signal processing section 45 generates a normal image 56 on the basis of the imaging signal which is output from the normal pixels 35 (S4). On the other hand, in the digital signal processing section 45, the amount of defocus is detected, on the basis of the first and second imaging signals which are output from the first and second phase difference pixels 36a and 36b included in the focus adjustment area EF, and the defocus image 57 is generated, on the basis of this amount of defocus (S5). Then, the normal image 56 and the defocus image 57 are sent to the finder display control section 48. In addition, the imaging information about the imaging mode, the shutter speed, the stop, and the like is also sent to the finder display control section 48.

The finder display control section 48 generates a video signal on the basis of the normal image 56, the defocus image 57, the information image, and the direction of shift of the eye position P of the photographer calculated by the shift direction calculation section 53, and thereby performs display on the EVFLCD 61. For example, in a case where the direction of shift of the eye position P is the right direction (Y in S6), the finder display control section 48 generates a video signal by which the defocus image 57 is positioned on the left side of the rectangular frame F indicating the focus adjustment area EF, and thereby performs display on the EVFLCD 61 (S7). On the other hand, in a case where the direction of shift of the eye position P is the left direction (N in S6), the finder display control section 48 generates a video signal in which the defocus image 57 is positioned on the right side of the rectangular frame F, and thereby performs display on the EVFLCD 61 (S8).

The normal image 56 and the defocus image 57 are generated on the basis of the image data, which is output from the imaging element 31, and the direction of shift of the eye position P of the photographer whenever imaging per one frame is performed, and displayed on the EVFLCD 61. In a case where the first and second indicators 58 and 59 of the defocus image 57 are positioned to be spaced by the first distance D1, if the focus adjustment of the imaging optical system 16 is adjusted by the rotation operation of the focus ring 17, the defocus image 57 changes in accordance with the change in the amount of defocus. In a case where the imaging optical system 16 is brought into focus by the rotation operation of the focus ring 17, the first distance D1 becomes "0", and the first and second indicators 58 and 59 are aligned in a straight line shape. A photographer is able to recognize the focus state of the imaging optical system 16 through the defocus image 57.

The photographer performs focus adjustment while checking the defocus image 57, and then presses the release button 20, thereby performing the imaging operation (Y in S9). In a case where the release button 20 is pressed, imaging is performed by the imaging element 31, and the normal image 56 is generated. This normal image 56 is compressed, and subsequently recorded on the recording medium 55 through the medium control section 46 (S10). In a case where the imaging operation is not performed (N in S9), the process returns to step S1.

As described above, even in a case where a part of the observation area E in the finder section 15 is hidden by the frame portion of the eye cup section 26 and the edge portion of the finder eyepiece window 26a, on the basis of the direction of shift of the eye position P of the photographer, the defocus image 57 is displayed in the area which is opposed to the direction of shift of the eye position P with respect to the center of the observation area E of the finder section 15. Therefore, the defocus image 57 is displayed at a position where the image is not hidden by the eye cup section 26 and the finder eyepiece window 26a. In such a manner, the defocus image 57 is displayed at an optimum position where the image is easily visually perceived by the photographer.

[Second Embodiment]

Figure 12A:
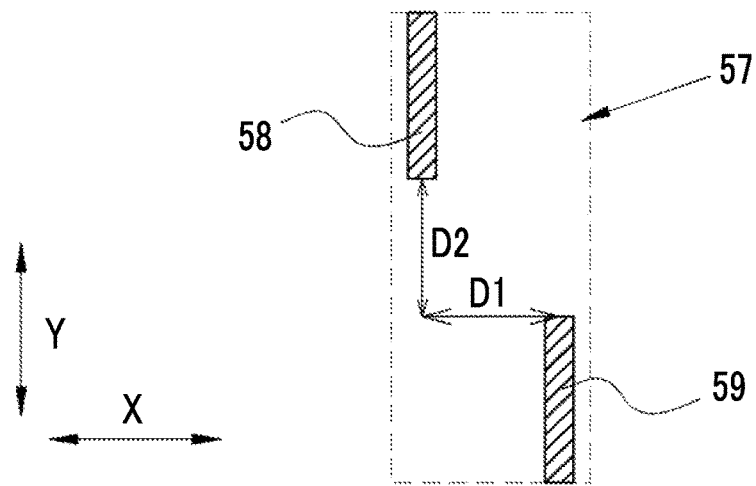
FIG. 12A is an explanatory diagram illustrating a defocus image of a second embodiment in an out-of-focus state.

In the first embodiment, the first and second indicators 58 and 59 constituting the defocus image 57 are spaced in the horizontal direction X (first direction), but in the second embodiment, as shown in FIG. 12A, the first and second indicators 58 and 59 are spaced not only in the horizontal direction X but also in the vertical direction Y (second direction) orthogonal to the horizontal direction X. In this case, as the amount of defocus of the imaging optical system 16 is smaller, the first distance D2, which is a distance between the first and second indicators 58 and 59 in the vertical direction Y, is made smaller.

Figure 12B:
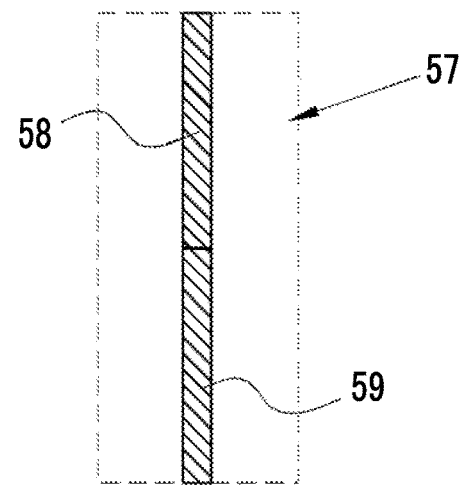
FIG. 12B is an explanatory diagram illustrating the defocus image of the second embodiment in an in-focus state.

As shown in FIG. 12B, in a case where the amount of defocus is "0", that is, in a case where the imaging optical system 16 is brought into focus by the rotation operation of the focus ring 17, both the first distance D1 and the second distance D2 become are "0", and the first and second indicators 58 and 59 are aligned in a straight line.

[Third Embodiment]

Figure 13A:
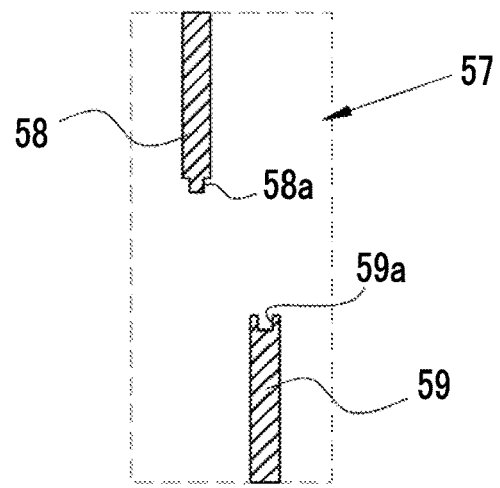
FIG. 13A is an explanatory diagram illustrating a defocus image of a third embodiment in an out-of-focus state.
Figure 13B:
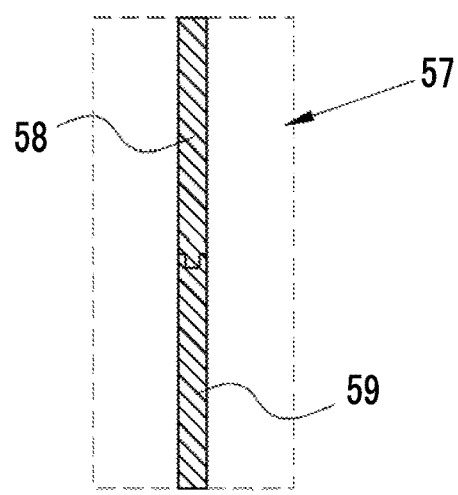
FIG. 13B is an explanatory diagram illustrating the defocus image of the third embodiment in an in-focus state.

In the third embodiment, as shown in FIG. 13A, a convex portion 58a is provided on a first indicator 58, and a concave portion 59a is provided on a second indicator 59. The convex portion 58a is provided in a portion of the first indicator 58 facing the second indicator 59 in the vertical direction Y. The concave portion 59a is provided in a portion of the second indicator 59 facing the first indicator 58 in the vertical direction Y. The first and second indicators 58 and 59 are spaced in the horizontal direction X and the vertical direction Y, in a manner similar to that of the second embodiment. As shown in FIG. 13B, in a case where the amount of defocus is "0", that is, in a case where the imaging optical system 16 is brought into focus, the distance between the first and second indicators 58 and 59 becomes "0", the convex portion 58a and the concave portion 59a are fitted.

[Fourth Embodiment]

Figure 14A:
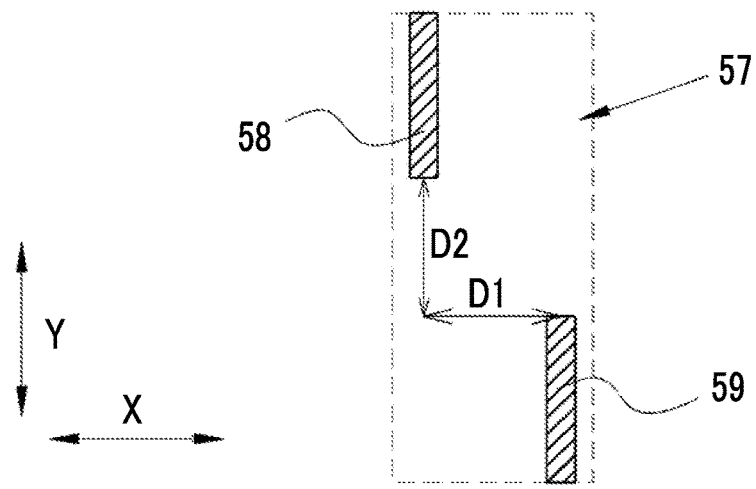
FIG. 14A is an explanatory diagram illustrating a defocus image of a fourth embodiment in an out-of-focus state.
Figure 14B:
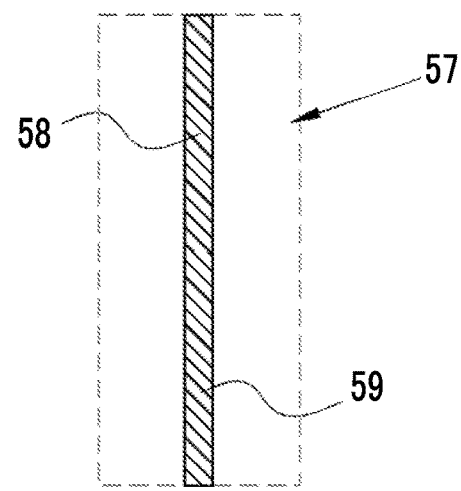
FIG. 14B is an explanatory diagram illustrating the defocus image of the fourth embodiment in an in-focus state.

In the first to third embodiments, in a case where the imaging optical system 16 is brought into focus, the distance between the first and second indicators 58 and 59 becomes "0" and the indicators have a straight line shape. However, in the fourth embodiment, in a case of the in-focus state, the first and second indicators 58 and 59 have a straight line shape, and the boundary between both of those disappears, and the indicators are integrated. For example, as shown in FIG. 14A, the first and second indicators 58 and 59 are spaced in the horizontal direction X and the vertical direction Y in accordance with the amount of defocus. However, as shown in FIG. 14B, in a case where the amount of defocus is "0", that is, in a case where the imaging optical system 16 is brought into focus, the first and second indicators 58 and 59 are integrated.

[Fifth Embodiment]

In the first to fourth embodiments, the distance between the first and second indicators 58 and 59 indicates only the amount of defocus. In the fifth embodiment, it is determined whether or not the amount of defocus is within the focal depth of the imaging optical system 16 (that is, whether or not the subject is within the depth of field). In a case where it is determined that the amount of defocus is outside the focal depth, the distance in the second direction is set to be constant regardless of the amount of defocus. In the present embodiment, for example, the digital signal processing section 45 functions as a determination section that determines whether or not the amount of defocus is within the focal depth, and creates the defocus image 57 in accordance with the determination result and the amount of defocus.

Figure 15A:
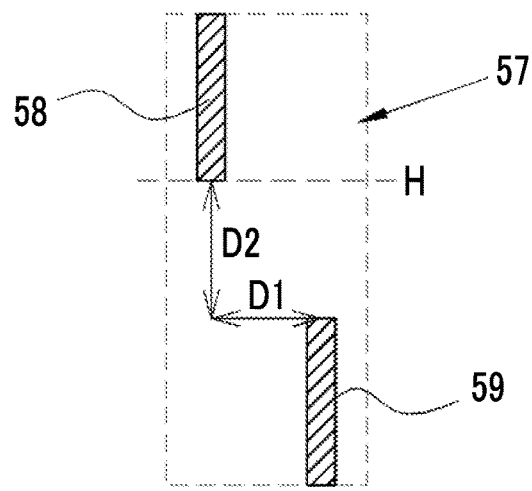
FIG. 15A is an explanatory diagram illustrating a defocus image of a fifth embodiment in an out-of-focus state.
Figure 15B:
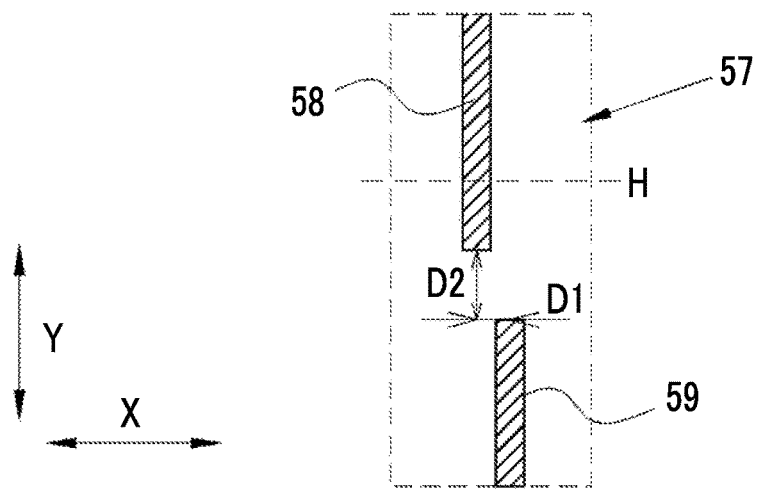
FIG. 15B is an explanatory diagram illustrating the defocus image of the fifth embodiment in an in-focus state.

In a case where the determination section determines that the amount of defocus is outside the focal depth, as shown in FIG. 15A, the second distance D2 is set to a constant value H, regardless of the amount of defocus. On the other hand, in a case where the determination section determines that the amount of defocus is within the focal depth, as shown in FIG. 15B, the second distance D2 is changed in accordance with the amount of defocus. As a result, in a case where the amount of defocus is within the focal depth, the second distance D2 is smaller than the constant value H, and decreases as the amount of defocus decreases.

[Sixth Embodiment]

Figure 16:
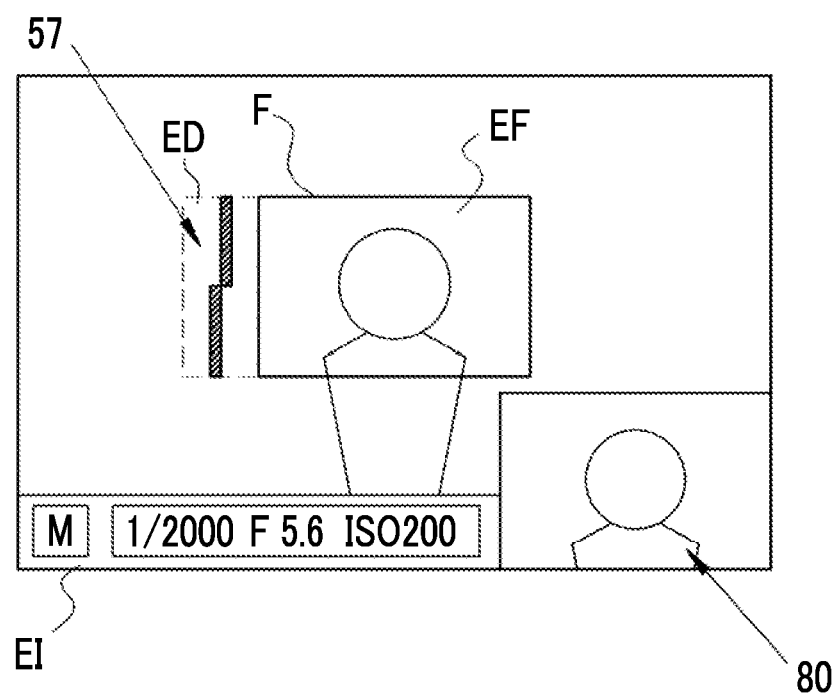
FIG. 16 is a view for explaining a superimposed display mode.

In the above embodiments, the OVF mode and the EVF mode are exemplified as the display modes of the finder section 15, but it is also possible to execute a superimposed display mode in which an electronic image is displayed to be superimposed on an optical image. In this superimposed display mode, as shown in FIG. 16, a normal image 80, which is an electronic image, is displayed near the corner of the observation area E. The normal image 80 corresponds to the subject image in the focus adjustment area EF. In the superimposed display mode, the main control section 32 controls the OVF shutter 63 such that the shutter blocks light from the area corresponding to the normal image 80. Thereby, a photographer is able to recognize the focus state of the imaging optical system 16 not only by the defocus image 57 but also by the normal image 80.

In the above-mentioned embodiments, the first direction, in which the first and second indicators 58 and 59 are spaced, is set as the horizontal direction, and the second direction is set as the vertical direction. However, the first direction may be set as the vertical direction, and the second direction may be set as the horizontal direction.

In each of the above-mentioned embodiments, the finder display control section 48 displays a defocus image 57 in the area which is opposed to the direction of shift of the eye position P in the horizontal direction (that is, in a case where the direction of shift of the eye position P is the right direction or the left direction). The present invention is not limited to this, and the finder display control section 48 may display the defocus image 57 in the area which is opposed to the direction of shift of the eye position P in the vertical direction, and may display the defocus image 57 in the area opposed to the direction of shift of the eye position P in the vertical direction and in the area which is opposed to the direction of shift of the eye position P in the horizontal direction.

In each of the above-mentioned embodiments, the focus adjustment area EF, for which the amount of defocus is calculated, is set as a predetermined area positioned at the center of the observation area E. However, the focus adjustment area is not limited to this, and may be set through an input device such as a touch panel. Further, a main subject detection section, which detects an image showing a main subject (for example, a human face) from the captured image, is provided, and an area including the detected main subject may be configured to be automatically set as the focus adjustment area EF.

In each of the above-mentioned embodiments, the imaging element 31 is a CMOS type image sensor, but may be a CCD type image sensor. In each of the above-mentioned embodiments, the finder section is a hybrid viewfinder, but it may be an electronic viewfinder.

In addition to the digital camera, the present invention is applicable to an imaging device such as a video camera having a finder section.

EXPLANATION OF REFERENCES

11: digital camera
15: finder section
16: imaging optical system
17: focus ring
31: imaging element
32: main control section
45: digital signal processing section
48: finder display control section
51: defocus amount detection section
52: defocus image generation section
53: shift direction calculation section
56: normal image
57: defocus image
58: first indicator
59: second indicator
D1: first distance
D2: second distance
E: observation area
EF: focus adjustment area

What is claimed is:

1. An imaging device comprising:
   an imaging optical system;
   a processor configured to perform a focus adjustment operation of the imaging optical system;
   an imaging element that generates a normal image by performing photoelectric conversion on a subject image from the imaging optical system, and generates first and second imaging signals by performing photoelectric conversion on each of first and second rays which are formed by performing pupil division on the subject image;
   the processor further configured to generate a defocus image, which indicates an amount of defocus of the imaging optical system, on the basis of the first and second imaging signals; and
   a finder section, including a finder objecting window, that is configured to be capable of observing the subject image or the normal image in an observation area;
   the processor further configured to:
      detect a position of an eye of a photographer who is in contact with the finder section;
      calculate a direction of shift of the position of the eye with respect to a specific position in the observation area, on the basis of the position of the eye that is detected; and
      display the defocus image in an area, which is opposed to the direction of shift with respect to the specific position in the observation area, in the observation area.

2. The imaging device according to claim 1,
   wherein the observation area has a focus adjustment area, in which the amount of defocus of the imaging optical system is calculated using the first and second imaging signals which are imaging signals obtained on the basis of the first and second rays, and
   wherein the processor is further configured to display the defocus image outside the focus adjustment area and in the area which is opposed to the direction of shift.

3. The imaging device according to claim 1, wherein the defocus image is indicated by first and second indicators which are spaced from each other in a first direction, and
   wherein the processor is further configured to decrease a first distance, which is a distance between the first and second indicators in the first direction, as the amount of defocus decreases.

4. The imaging device according to claim 3, wherein the first and second indicators are spaced from each other in a second direction orthogonal to the first direction, and
   wherein the processor is further configured to decrease a second distance, which is a distance between the first and second indicators in the second direction, as the amount of defocus decreases.

5. The imaging device according to claim 4, wherein the processor is further configured to set the first and second distances to 0 in a case where the amount of defocus is 0.

6. The imaging device according to claim 5, wherein the processor is further configured to integrally display the first and second indicators in a case where the amount of defocus is 0.

7. The imaging device according to claim 5,
wherein a part of the first indicator, which faces the second indicator in the second direction, has a convex portion,
wherein a part of the second indicator, which faces the first indicator in the second direction, has a concave portion, and
wherein in a case where the amount of defocus is 0, the convex portion and the concave portion are fitted.

8. The imaging device according to claim 4
wherein the processor is further configured to:
determine whether the amount of defocus is within a focal depth of the imaging optical system, and
change the second distance depending on the amount of defocus in a case where it is determined that the amount of defocus is within the focal depth, and keeps the second distance constant regardless of the amount of defocus in a case where it is determined that the amount of defocus is outside the focal depth.

9. The imaging device according to claim 1,
wherein the processor is further configured to detect the position of the eye in each of a vertical direction and a horizontal direction, and
display the defocus image in an area which is opposed to the direction of shift in the vertical direction, and in an area which is opposed to the direction of shift in the horizontal direction.

10. The imaging device according to claim 1, wherein the specific position is at a center of the observation area.

11. A control method of an imaging device including
an imaging optical system,
a processor configured to perform a focus adjustment operation of the imaging optical system,
an imaging element that generates a normal image by performing photoelectric conversion on a subject image from the imaging optical system, and generates first and second imaging signals by performing photoelectric conversion on each of first and second rays which are formed by performing pupil division on the subject image,
the processor further configured to:
generate a defocus image, which indicates an amount of defocus of the imaging optical system, on the basis of the first and second imaging signals, and
a finder section, including a finder objecting window, that is configured to be capable of observing the subject image or the normal image in an observation area,
the control method comprising:
an eye position detection step of detecting a position of an eye of a photographer who is in contact with the finder section;
a shift direction calculation step of calculating a direction of shift of the position of the eye with respect to a specific position in the observation area, on the basis of the position of the eye detected by the eye position detection step; and
a finder display control step of displaying the defocus image in an area, which is opposed to the direction of shift with respect to the specific position in the observation area, in the observation area.

* * * * *